March 21, 1944.　　R. E. DESCHNER　　2,344,681
DRAWWORKS
Filed May 10, 1941　　3 Sheets-Sheet 1

Inventor
Richard E. Deschner
By Lyon & Lyon
Attorneys

March 21, 1944.  R. E. DESCHNER  2,344,681
DRAWWORKS
Filed May 10, 1941  3 Sheets-Sheet 2

Inventor
Richard E. Deschner
By Lyon & Lyon
Attorneys

March 21, 1944.   R. E. DESCHNER   2,344,681
DRAWWORKS
Filed May 10, 1941     3 Sheets-Sheet 3
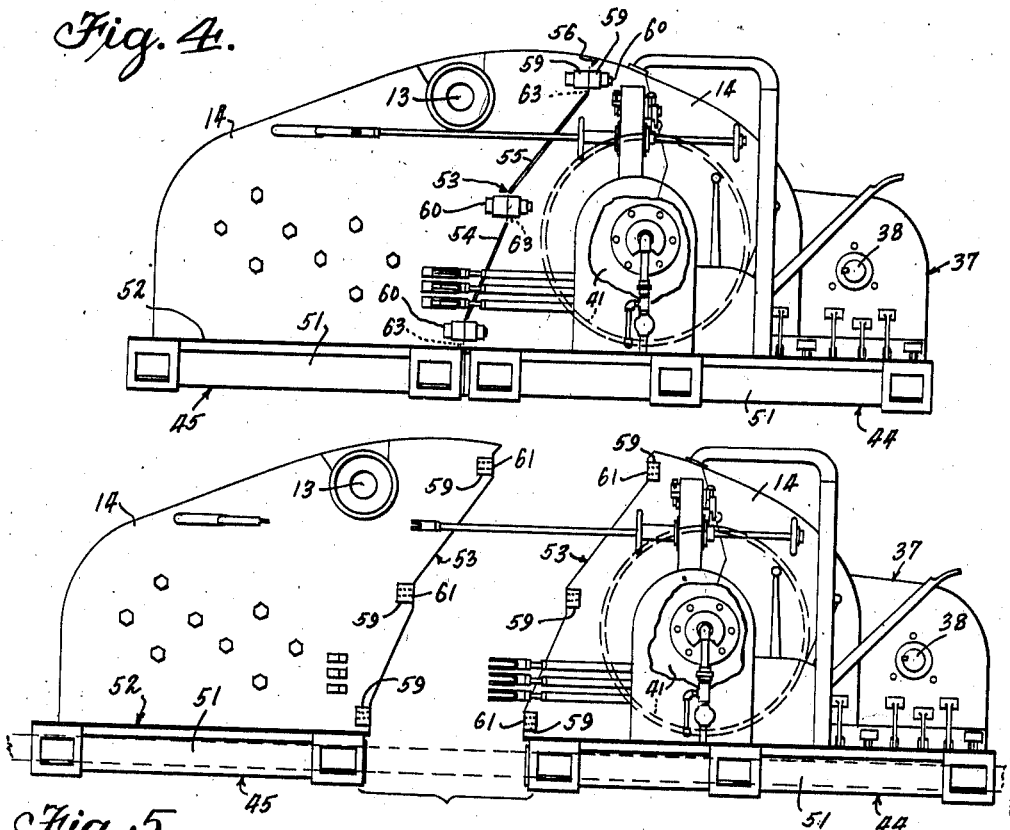
Fig. 4.
Fig. 5.
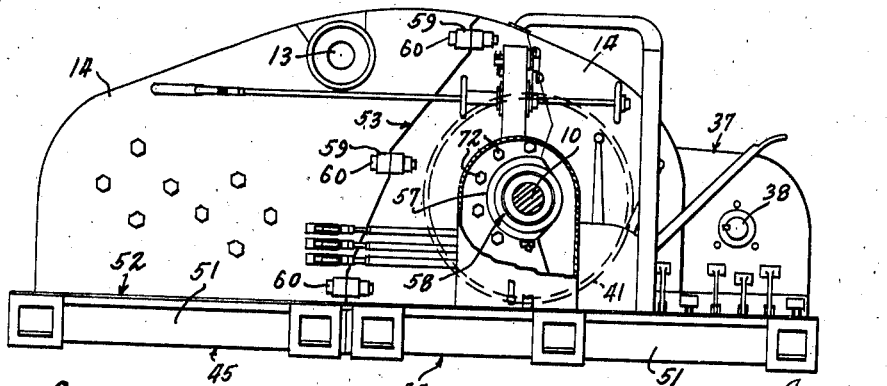
Fig. 6.
Inventor
Richard E. Deschner
By Lyon & Lyon
Attorney Patented Mar. 21, 1944

2,344,681

UNITED STATES PATENT OFFICE 2,344,681

DRAW WORKS

Richard E. Deschner, Los Angeles, Calif., assignor to The National Supply Company, Pittsburgh, Pa., a corporation of Pennsylvania Application May 10, 1941, Serial No. 392,882

6 Claims. (Cl. 254—187)

This invention relates to drawworks of the type employed in the drilling of wells. As wells are required to be drilled to greater depths, the load imposed on the drawworks increases correspondingly. In order to meet this increase in load, a large diameter cable is used for supporting the weight of the drill stem and casing. The use of the larger sizes of cables requires increase in length or diameter of the spooling drum for the cable. As the life of the cable is dependent upon the bending stresses imposed upon it, it is found advantageous to increase the diameters of the drum upon which it is to be wound. The length of the spooling drum determines the number of layers of cable which will be spooled thereon so that the longer the length from the cable, the less the number of layers and as winding the cable upon itself under these heavy loads quickly depreciates the cable, it is well established that the longer the drum the greater the life of the cable.

As wells have increased in depth, the requirement for increased speeds of operation has increased in order to reduce the time required for raising and lowering the drill stem and bit into the hole for drilling operations. The requirement of increased speed of operation has made it necessary to employ one or more friction clutches in the power drives to the drumshaft and the friction types of clutch require considerable space for their mounting.

In order to effectively handle such large loads on such large diameter and long drums under high speed operation, it is required that provision be made for the direct coupling of a hydraulic type of brake to the drumshaft. All of these requirements result in the construction of a drawworks wherein the drum supporting shaft is considerably longer than the maximum width permitted to be transported over a highway. As the rotary drilling equipment of the type under consideration is of high cost, it is essential that the construction be such as to permit its easy and economical transportation from location to location where the drilling operations are desired to be performed.

In the past this problem has been met somewhat by arranging the various shafts of the drawworks in relatively close coupled relation so that the over-all depth of the drawbacks measured in a direction transverse of the shafts was within the specified limit. As the speed of operation requirement has increased requiring a greater number of speed transmissions from the drive shaft to the drumshaft, it is not economically feasible to closely couple the shafts to within the limits permitted for highway transportation. For the foregoing reasons, and for many others, it has been found necessary in a rotary drawworks to increase the number of shafts until it is no longer possible to include them within the specified road limit. This is particularly true to drawworks constructed for operation utilizing as the source of power internal combustion engines since this type of power source lacks the speed flexibility of the heretofore conventionally used steam engine drive. Requirements are now such that it is no longer practical to restrict either the length or the width of a heavy duty drawworks to a dimension within the specified limits for highway transportation. The same problem is encountered to a great degree on railroad transportation as the drawworks becomes too bulky, too wide, or long, to be economically transported.

It is accordingly an object of this invention to provide a heavy duty drawworks of high capacity which may be separated into independent sections for transportation.

Another object of this invention is to provide a drawworks of high capacity constructed so as to permit division into two independent sections and including a joint for connecting the two cooperating sections.

Another object of this invention is to provide a method of forming a joint between two drawworks sections in order that strict alignment of the various parts may be preserved.

Another object of this invention is to provide a high capacity rotary drawworks having an improved form of bearing mounting for the drumshaft.

Another object of this invention is to provide a bearing box having surface contact for more than 180° with its bearing support, and which is adapted to be moved from the support by turning the bearing box through a portion of a revolution.

Other objects and advantages of this invention it is believed will be apparent from the following detailed description of a preferred embodiment thereof as illustrated in the accompanying drawings.

In the drawings:

Figure 4 is an end elevation of the rotary drawworks embodying my invention before separation of the same into units.

Figure 5 is a view similar to Figure 4 illustrating the units as separated.

Figure 6 is a view thereof illustrating the parts as reassembled.

Figure 1:
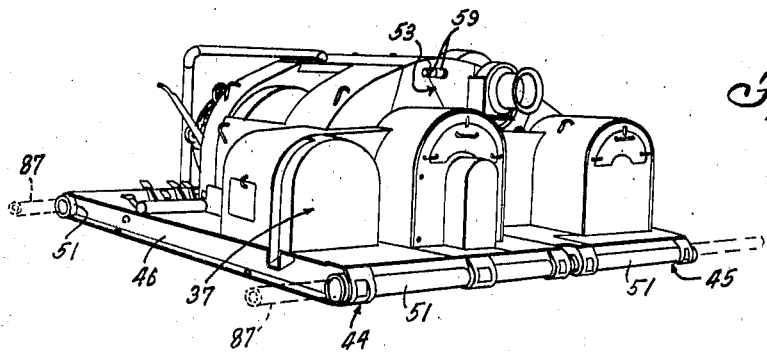
Figure 1 is a perspective view of a heavy duty rotary drawworks embodying my invention.

In the preferred embodiment of my invention as illustrated in the accompanying drawings, the drawworks is illustrated as including a drumshaft 10, a lineshaft 11, a jackshaft 12 and a catshaft 13. These shafts are rotatably supported at their opposed ends on spaced bearing supports 14 and 15.

The jackshaft 12 is driven from any suitable source of power to the drive sprocket 16. The drive sprocket 16 is adapted to be releasably clutched to the jackshaft 12 through the medium of a friction type clutch 17. Multiple speed drive means is provided between the jackshaft 12 and the lineshaft 11 for driving the lineshaft 11 at a multiplicity of speeds from the jackshaft. These drive means include the transmission connections including the aligned sprockets 18 and 19, and 20 and 21, and 22 and 23, connected through the medium of transmission chains 24. Clutches 25, 26 and 27 are provided for rendering each drive operative or inoperative as desired. A brake drum 28 is mounted on the jackshaft 12 to enable the jackshaft to be held from rotation.

Low and high speed drives are provided between the lineshaft 11 and the drumshaft 10. The low speed drive, including the aligned sprockets 29 and 30, are connected through the medium of a drive chain and a clutch 31 is provided for rendering this drive selectively operable as desired.

The high speed drive is provided through the medium of the aligned sprockets 32 and 33 and the connecting chain. A friction clutch 34 is provided for selectively engaging the sprocket 33 with the drumshaft 10. The sprocket 33 is a double sprocket carrying the sprocket 35 in position of alignment with a sprocket 36 mounted upon a rotary machine drive assembly 37. The sprocket 36 is adapted to be releasably coupled to the shaft 38 of this assembly through the medium of a friction clutch 39. Secured to the shaft 38 is the rotary machine drive sprocket 40. Mounted upon the drumshaft 10 is a hydraulic brake 41 which may be of the type illustrated in the De La Mater Patent No. 1,992,911.

The catshaft 13 may be driven from the lineshaft 11 through the medium of a chain and sprocket drive 42. A clutch 43 is provided for selectively engaging this drive.

The supporting structure for the drawworks having the hereinabove preferred form, or as modified in the manner well understood in this art, includes the bearing supports 14 and 15 and skid frames 44 and 45. The skid frame 44 includes a plurality of spaced beams 46, 47 and 48 extending longitudinally and parallel with the drawworks shafts. The skid frame 41 is also formed with longitudinally extending parallel beams 49 and 50.

Each skid frame 44 and 45 constitutes a welded frame assembly wherein the longitudinally extending beams are connected together and welded to transverse beams 51. The bearing supports 14 and 15 extend transversely over the skid frames 44 and 45 and are welded integrally thereto along their supporting lines 52. In order to separate the drawworks into two independent sections as may be required for transportation as hereinabove referred to, the bearing supports 14 and 15 are cut into two sections along a joint generally indicated at 53. The joint 53 is so located that the maximum horizontal dimension of either section taken in a direction parallel to the bearing supports 14 and 15 is within the limits established for highway transportation. When thus separated, the front portion of the drawworks is supported upon the front skid frame 44 and the rear portion of the drawworks is supported upon the rear skid frame 45.

The joint 53 between the two drawworks sections is preferably formed in the following manner:

Each of the bearing supports 14 and 15 is preferably formed of an integral steel plate of suitable thickness trimmed to the desired outline. A plurality of discontinuous slots 54, 55 and 56 are then flame cut to produce straight line cuts. The slots thus formed are interrupted and are not continuous so that the plates 14 and 15 are still handled as integral members.

With the plate thus fabricated, holes are drilled for the mounting of the bearings required for supporting the various shafts and the surface 57 is machined for the drumshaft bearing box 58. Secured means are then provided along the discontinuous slots and as here illustrated, includes separable pairs of joint blocks 59 which are welded to the plates 14 and 15 between the ends of the slots 54—55, 55—56, and at the lower end of the slot 54.

Bolts 60 are passed through the aligned joint blocks maintaining the sections of the plates 14 and 15 against misalignment or separation. As the plate is thus fabricated, it is then welded along its lower edge or joint line 52 integrally with the skid frames 44 and 45. Additional flame cuts 63 are then made through the plates to connect the slots 54, 55 and 56, thus forming a continuous break across the plates. These additional cuts 63 are formed parallel to the contacting surfaces 61 between the pairs of joint blocks 59. By this procedure the two sections of the bearing supporting plates 14 and 15 are assured from misalignment when separated. In addition to the securing means provided by the joint blocks 59 and 61, additional means 62 may be provided for releasably connecting the skid frames 44 and 45 directly together and for maintaining them in correct alignment.

Mounted upon the drumshaft 10 is a spooling drum 64 having brake flanges 65 at its opposed ends. The brake flanges 65 are subject to fairly rapid wear in service and accordingly must be replaced frequently in the field. This requires that the drumshaft 10 and its associated parts be susceptible of removal from the supporting structure. The tremendous loads imposed upon the drumshaft and drum require, however, that the bearings provided for supporting the drumshaft be of the most substantial form so that ordinary forms of detachable mounting for such bearings do not provide adequate support. It has formerly been the practice to secure the bearing boxes to the bearing supports by means of bolts, in which case the bolts are required to take the full load in shear. In the construction of heavy duty high-capacity drawworks, this type of mounting becomes unsatisfactory because the size of the bolts necessary to support the load and to resist the shearing action is such that they are unsuitable for easy disengagement. In order to overcome this difficulty, the bearing supports 14 and 15 are provided with the machined cylindrical surfaces 57 which extend on an arc greater than 180°. With this surface extending greater than 180°, the opening thereto indicated at 66 must be smaller than the diameter of the surface 57. A bearing box 58 is provided with a corresponding machined surface 68 adapted to seat on the surface 57.

The two ends of the surface 68 are defined by inwardly sloping flat surfaces 69 which meet the cylindrical surface 70 as tangents. The cylindrical surface 70 is of a diameter smaller than that of the meeting surfaces 57 and 68. Consequently when the bearing box 58 is turned within the bearing support for an angular distance of about 90°, it is possible to withdraw the bearing box 58 laterally from the support through the said restricted opening 66.

A self-aligning bearing 71 is carried within the bearing box 58 and rotatably supports the end of the drumshaft 10. Bolts 72 extend through corresponding apertures 73 and 74 provided in the supporting plate 14 and bearing box 58 and serve to prevent rotation of the bearing box 58. A particular feature of this construction is that the upward pull of the cable is directly taken up against the surfaces 57 and 68 which extend for a considerable distance beyond the vertical.

When it is desired to withdraw the bearing box 58 from the bearing support 14, the bolts 72 are first removed.

A bar or other suitable device not illustrated is then inserted between the lugs 75 provided on the back side of the circular flange 76 of the bearing box to rotate the bearing box through about a one-quarter revolution.

To facilitate free turning of the surface 68 on the surface 57, an anti-friction roller 77 is provided. The roller 77 is mounted on the eccentric portion 78 of a pin 79 which is mounted for rotation within the bore 80 provided in the bearing support directly below the center of the drumshaft 10.

By turning the head portion 81 of the pin 79, the roller 77 can be brought into contact with the outer diameter with the periphery of the flange 76, thereby relieving the surfaces 57 and 68 of a considerable portion of the weight of the drumshaft assembly and permitting the bearing box 58 to be turned more easily. A metal strip 82 is welded to the outside surface of the bearing support 14 and serves to maintain the pin 79 in position against accidental displacement.

When the clearance portion defined by the surfaces 69 and 70 has been rotated far enough into the recess defined by the surface 57, the bearing box 58 may be moved laterally from the bearing support 14. With this construction, the path of the drumshaft 10 during withdrawal from the bearing supports 14 and 15 may be in a direction inclined upwardly. This is often an important point as the brake mechanism for operating the bands over the rims 65 may obstruct horizontal movement of the drumshaft if its path upon such removal has any downward component.

Figure 2:
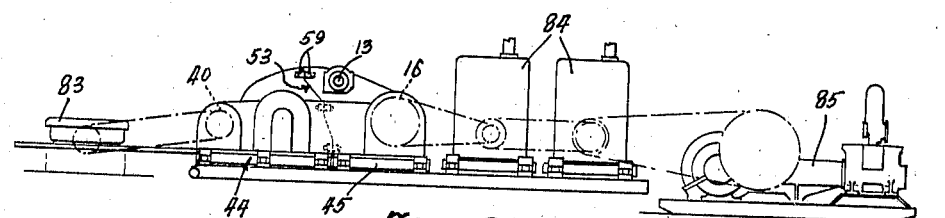
Figure 2 is a side elevation thereof illustrating the same with relation to the drive engines, rotary machine and mud pump.
Figure 7:
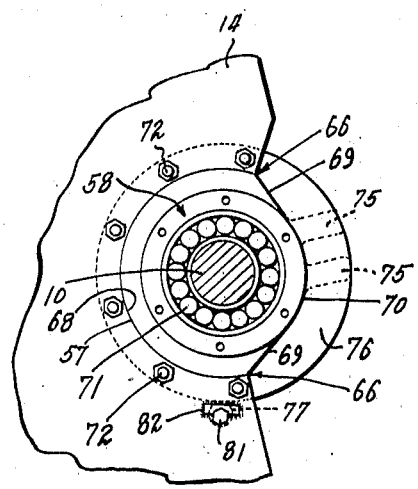
Figure 7 is a detail view of a bearing assembly taken substantially on the line 7—7 of Figure 3.
Figure 8:
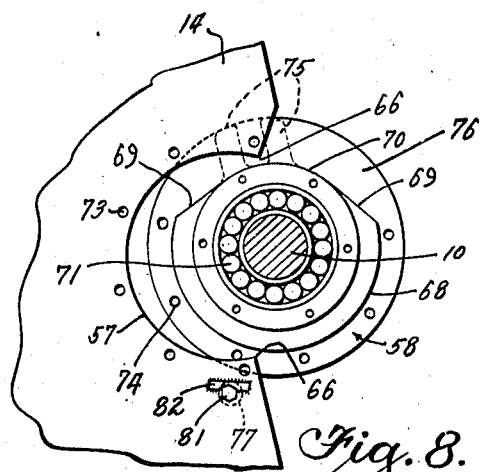
Figure 8 is a view similar to Figure 7 illustrating the removal of the shaft and bearing from the bearing support.
Figure 3:
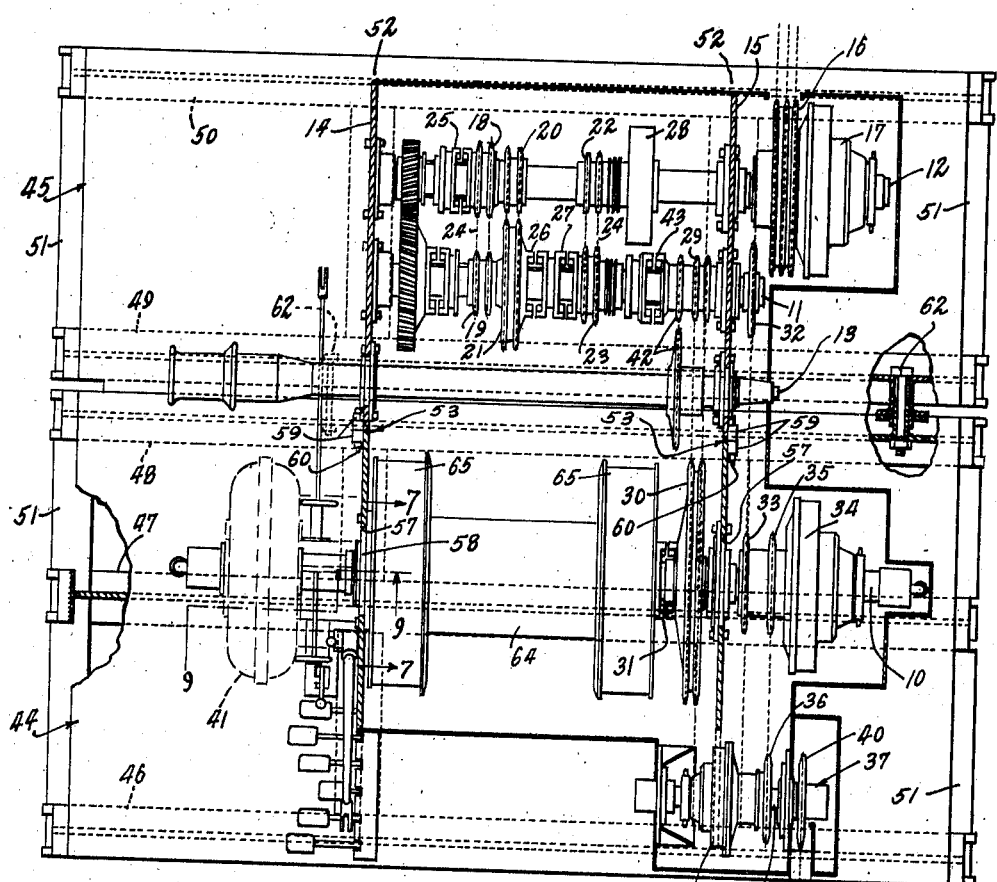
Figure 3 is a top plan view of the rotary drawworks embodying my invention illustrating the same with the enclosing covers removed.
Figure 9:
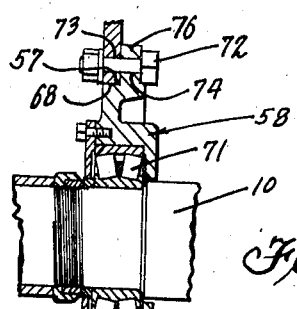
Figure 9 is a section through the bearing structure taken substantially on the line 9—9 of Figure 3.

The drilling assembly as illustrated in Figure 2 includes not only the drawworks as hereinabove set forth, but also includes the rotary machine 83 which is driven from the rotary machine drive sprocket 40 and the internal combustion type power units 84 commonly provided in this type of drilling rig as the source of power for operating the rotary drawworks and for operating the mud pump 85 providing the drilling fluid for the drilling operation. As illustrated, the internal combustion engines 84 are connected so that they may be compounded.

In assembling the two sections of the rotary drawworks embodying my invention as hereinabove described, I prefer to provide each of the skid frames 44 and 45 with tubular transverse connecting members at the outer ends of the frames as illustrated at 51 in Figure 1. By the use of the tubular beams at this portion of the structure, alignment between the two sections may be maintained by passing through the tubular sections a pipe indicated in dotted lines at 87 to hold the two sections in proper alignment during the connecting of the other fastening means hereinabove described.

Having fully described my invention, it is to be understood that I do not wish to be limited to the details herein set forth, but my invention is of the full scope of the appended claims.

I claim:

1. In a rotary drawworks, the combination of a drumshaft and a jackshaft disposed in parallel relation, a spooling drum mounted on the drumshaft, means whereby the jackshaft may drive the drumshaft, a pair of separable skid frames positioned side by side and extending longitudinally of said shafts, a pair of spaced parallel bearing supports extending transversely of said skid frames and secured integrally thereupon, the bearing supports each being split along a joint extending upwardly from a position between said skid frames, thereby dividing the drawworks into a front portion and a rear portion, bearing means carried by the front portion for rotatably supporting the drum shaft, additional bearing means carried by the rear portion for rotatably supporting the jackshaft, securing means spaced at intervals along said joint, said securing means being releasable to permit separation of the front and rear portions of the drawworks for transportation as separate units.

2. In a rotary drawworks, the combination of a drumshaft and a jackshaft disposed in parallel relation, a spooling drum mounted on the drumshaft, transmission connections whereby the jackshaft may drive the spooling drum, a pair of separable base members positioned side by side and extending longitudinally of said shafts, a pair of spaced parallel bearing supports each extending transversely across both of said base members, said bearing supports each including a substantially flat vertically extending plate integrally secured along its lower edge to both of said base members, said plates each being divided along a joint extending upwardly from a position near both of said base members, thereby dividing the drawworks into a front portion and a rear portion, bearing means carried by the front portion for rotatably supporting the drumshaft, additional bearing means carried by the rear portion for rotatably supporting the jackshaft, securing means adapted to maintain the front and rear portions in assembled relation, said securing means being releasable to permit separation of the front and rear portions of the drawworks for transportation as separate units.

3. In a rotary drawworks, the combination of a drumshaft having a spooling drum mounted thereon, a pair of separable skid frame assemblies positioned side by side and extending longitudinally of said drumshaft, a pair of spaced parallel bearing supports extending transversely of said skid frame assemblies and secured integrally thereupon, bearing means carried on the front portion of each of said bearing supports adapted to support the drumshaft, a jackshaft and a lineshaft each disposed parallel to said drumshaft, bearing means carried on the rear portion of each of said bearing supports adapted to support the jackshaft and the lineshaft, means to drive the jackshaft, means whereby the jackshaft may drive the line shaft, means whereby the lineshaft may drive the drumshaft including aligned sprockets on the shafts connected by a drive chain, the bearing supports each being split along a joint dividing the said front portion from the said rear portion and extending upward from a position between said skid assemblies, securing means spaced at intervals along said joint, said securing means being releasable to permit separation of the front and rear portions upon disconnection of said drive chain.

4. In a rotary drawworks, the combination of a drumshaft and a jackshaft disposed in parallel relation, a spooling drum mounted on the drumshaft, chain and sprocket means whereby the jackshaft may drive the drumshaft, a pair of separable skid frames positioned side by side and extending longitudinally of said shafts, a pair of spaced parallel bearing supports extending transversely of said skid frames intermediate the ends thereof and secured thereto, drumshaft bearing means carried on the bearing supports for rotatably supporting the drumshaft, jackshaft bearing means carried on the bearing supports for rotatably supporting the jackshaft, the bearing supports each being divided along an upwardly extending joint located between the drumshaft and jackshaft, securing means spaced along said joint, said securing means being releasable to permit separation of the skid frames, upon disassembly of said chain and sprocket means.

5. In a drawworks structure, the combination of spaced parallel bearing supports for supporting a plurality of shafts, at least four supporting base members for said bearing supports arranged transversely of and extending beyond each of said bearing supports, means connecting said base members to provide two separate and detachable frames, said bearing supports being provided with a detachable joint connection to permit separation with the respective supporting frames, and means to connect said frames along said joint connection.

6. In a rotary drawworks, the combination of a plurality of parallel shafts, a pair of spaced bearing supporting elements, bearing members carried by the bearing supporting elements for supporting said shafts, a pair of base structures extending parallel with the shafts, the spaced bearing supporting elements being divided on the line beginning at the base structures and extending upwardly through the bearing supporting elements whereby two separate transportable units are formed, each including its base structure, and a portion of each of said bearing supporting elements and the parallel shafts carried thereby, and means to connect the adjacent bearing supporting elements along the line of division thereof.

RICHARD E. DESCHNER.